United States Patent [19]
Reymond

[11] Patent Number: 4,821,571
[45] Date of Patent: Apr. 18, 1989

[54] DAMPING DEVICE AND A DEVICE FOR MEASURING THE LEVEL OF FUEL IN A MOTOR VEHICLE FUEL TANK INCLUDING SUCH A DAMPING DEVICE

[75] Inventor: Philippe Reymond, Yerres, France

[73] Assignee: Jaeger, Levallois Perret, France

[21] Appl. No.: 17,447

[22] Filed: Feb. 24, 1986

[30] Foreign Application Priority Data

Feb. 21, 1986 [FR] France ................. 86 02420

[51] Int. Cl.⁴ .................. G01D 11/12; G01F 23/32
[52] U.S. Cl. ............................. 73/317; 73/430
[58] Field of Search ............... 73/317, 318, 305, 313, 73/314, 430; 403/120, 380, 99, 145, 161, 162, 40; 188/290; 277/205, 123

[56] References Cited

U.S. PATENT DOCUMENTS

| 916,166 | 3/1909 | Kaplan | 73/317 |
| 2,266,298 | 12/1941 | Bacon | 73/317 |
| 2,569,311 | 9/1951 | Hoare et al. | 73/430 |
| 3,598,208 | 8/1971 | Bronder | 188/290 |
| 3,854,737 | 12/1974 | Gilliam | 277/205 |
| 3,915,462 | 10/1975 | Bruns et al. | 277/123 |
| 4,229,973 | 10/1980 | Hara | 73/317 |

FOREIGN PATENT DOCUMENTS

| 0025425 | 8/1980 | European Pat. Off. |
| 1155262 | 10/1963 | Fed. Rep. of Germany |
| 1228814 | 11/1966 | Fed. Rep. of Germany |
| 1269815 | 6/1968 | Fed. Rep. of Germany |
| 838289 | 3/1939 | France |
| 2306433 | 10/1976 | France |
| 383623 | 11/1932 | United Kingdom |

Primary Examiner—Allan N. Shoap
Assistant Examiner—Patrick R. Scanlon
Attorney, Agent, or Firm—Fleit, Jacobson, Cohn & Price

[57] ABSTRACT

The present invention relates to a damping device of the type comprising a housing (40) defining a sealed chamber (42) containing a viscous damping fluid such as silicone and receiving a blade capable of displacement relative to the housing. In accordance with the invention, the housing (40) and the blade (80) comprise respective series of fins (50, 51, 52, 53 and 90, 92, 94, and 96) which are interleaved. Thus, relative displacement of the blade inside the housing (40) is braked by a combination firstly of the controlled flow of fluid from one side of the blade to the other via interstices between the blade and the housing, and secondly by viscous friction between the interleaved fins. The invention also relates to a device for measuring the level of fuel in a motor vehicle fuel tank and including such a damping device.

6 Claims, 6 Drawing Sheets

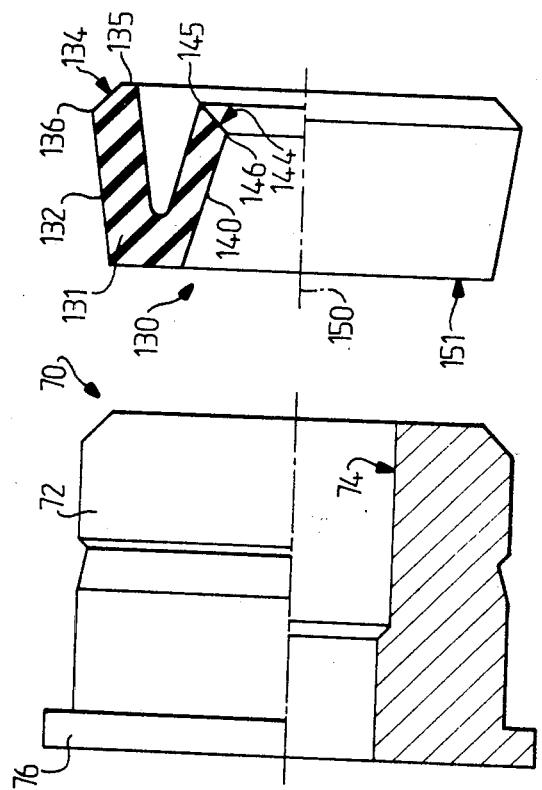
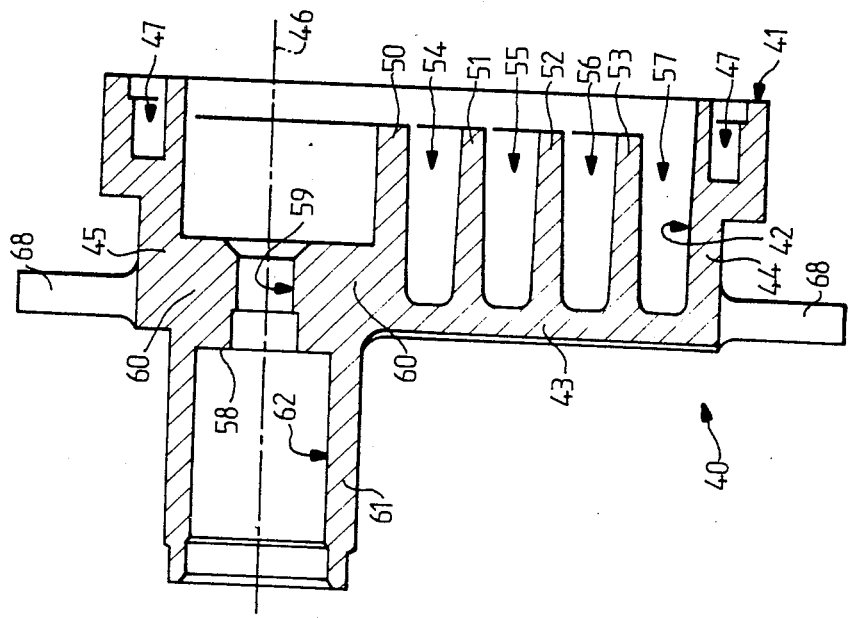

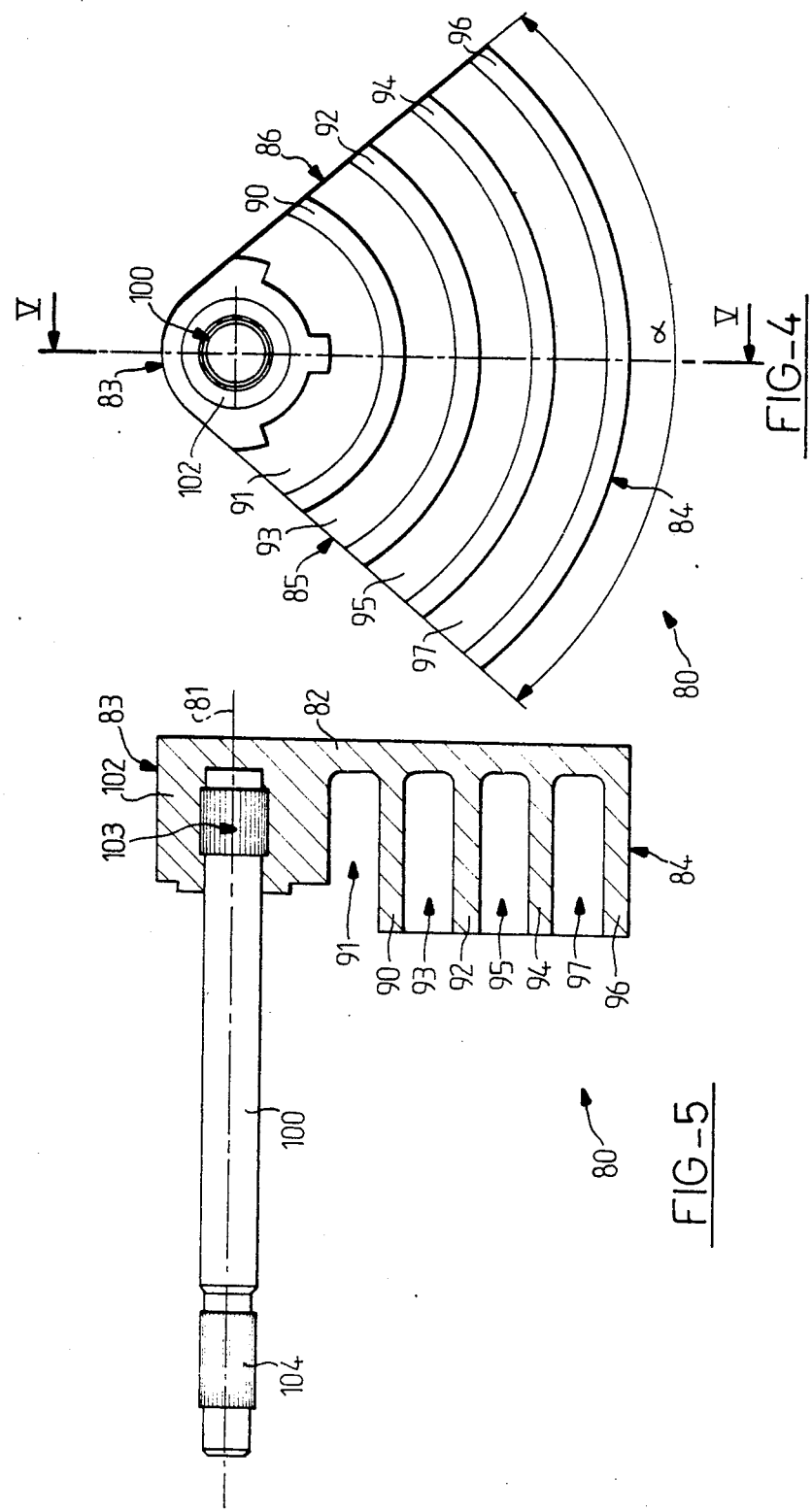

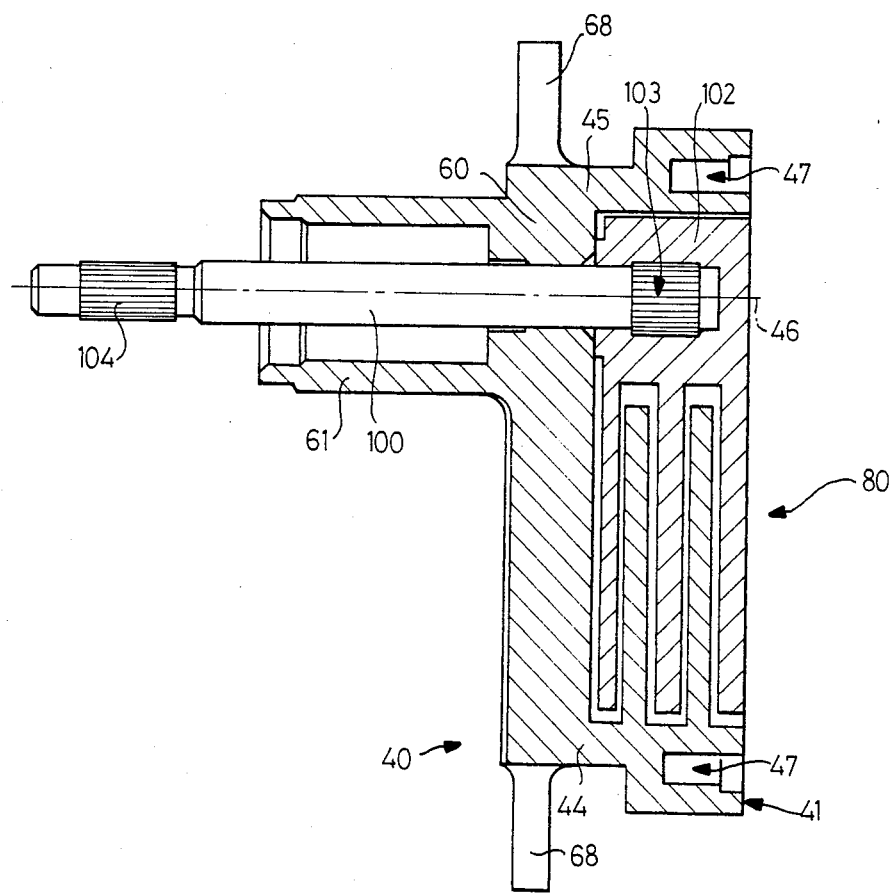
FIG_8

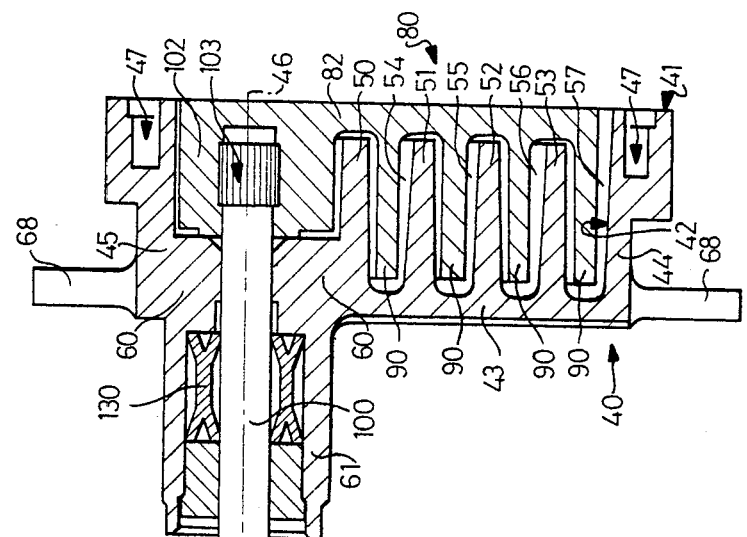
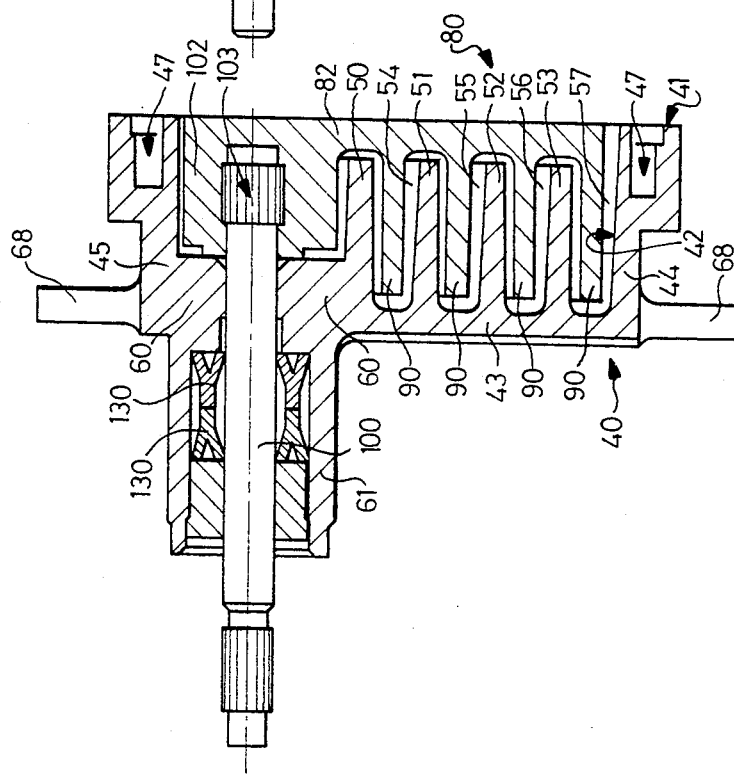

DAMPING DEVICE AND A DEVICE FOR MEASURING THE LEVEL OF FUEL IN A MOTOR VEHICLE FUEL TANK INCLUDING SUCH A DAMPING DEVICE

The present invention relates to measuring the level of fuel in a motor vehicle fuel tank.

The present invention relates more particularly to measuring the level of fuel in a motor vehicle fuel tank by means of a device comprising a moving member including a float which follows the fuel level and a sensitive member such as a rheostat which is controlled by the moving equipment and which delivers information representative of the fuel level.

BACKGROUND OF THE INVENTION

It is well known that such measuring devices are highly sensitive to waves of the fuel in the tank, due to the shape of the road or to accelerations and decelerations of the vehicle.

Attempts have been made to limit the effect of waves of fuel by associating a damping device with the moving equipment so as to smooth the information delivered by the rheostat type sensitive member.

As already described in patent applications numbers FR-A No. 838 289, 2 306 433, and DE-A Nos. 1 228 814, 1 269 815, proposals have been made for damping devices comprising a closed cylindrical chamber containing a moving piston, with the chamber and the piston being connected to different elements of the moving equipment. These damping devices behave like a hydraulic shock absorber, with the hydraulic fluid of the shock absorber for braking displacement of the piston being constituted, in this case, by the fuel in the tank.

Proposals have also been made, as described in German patent specification DE-B No. 1 155 262 to provide a damping device comprising a housing defining a sealed chamber containing a viscous damping fluid, such as silicone, and receiving a blade capable of relative displacement within the housing. The blade is received in the housing and is connected to the moving equipment. The displacements of the blade in the chamber filled with viscous fluid, and consequently the displacements of the moving equipment, are braked by the controlled flow of fluid from one side of the blade to the other via interstices between the blades and the housing.

Similarly, in the above-mentioned piston-and-chamber damping devices the damping and braking effect is due to the controlled flow of fluid from one side of the piston to the other side thereof via interstices between the piston and the cylinder chamber.

The aim of the present invention is to provide a new damping device which provides an improved damping effect over prior art damping devices.

Another aim of the present invention is to provide a damping device which is simple in structure and is therefore easily mass produced, and which also has a completely uniform response, i.e. a completely uniform damping coefficient.

Another aim of the present invention is to provide a damping device which is very strong and reliable.

Another aim of the present invention is to provide a damping device capable of withstanding large changes in temperature without being damaged.

Another aim of the present invention is to provide a damping device which is completely sealed so as to avoid polluting its environment, i.e. a damping device from which it is impossible for any viscous fluid, in particular silicone, to leak out into the fuel tank, and which is also completely insensitive to fuel vapors.

SUMMARY OF THE INVENTION

The present invention provides a damping device comprising a housing defining a sealed chamber containing a viscous damping fluid such as silicone and receiving a blade capable of moving relative to the housing, wherein both the housing and the blade possess respective series of interleaved fins. Thus, by virtue of the structure proposed by the present invention, relative displacement of the blade and the housing is braked not only by the controlled flow of fluid from one side of the blade to the other via the interstices between the blade and the housing, but also by the high viscous friction between the interleaved fins.

As a result, a damping device in accordance with the invention can provide a greatly increased damping coefficient compared with prior art devices.

Advantageously, the blade is pivotally mounted in the chamber of the housing with the fins provided on the housing and on the blade being preferably in the form of cylindrical sectors.

Thus, in thepresently preferred embodiment, the housing defines a sealed chamber which is in the form of a semicylindrical chamber having a series of main semicylindrical fins which are concentric and which contain a viscous damping fluid, while the blade possesses a plane sheet in the form of a sector of a disk extending over an angle of less than 180° and provided with a series of secondary concentric semicylindrical fins inserted between the main fins.

Where appropriate, the fins may nevertheless be generally plane and extend transversely to the pivot axis of the blade.

Advantageously, the width if the gap between two adjacent fins lies between 0.6 mm and 0.4 mm and is preferably about 0.5 mm.

Advantageously, the fins of at least one of the two series of fins provided respectively on the housing and on the blade have main surfaces which converge slightly towards their free edges with a convergence angle of about 2° to about 4°.

In accordance with the invention, the blade is preferably fixed to a shaft passing through one of the walls of the housing, and sealing means are provided on the periphery of the shaft to prevent the viscous damping fluid from leaving the housing and/or to prevent an external fluid from penetrating into the housing. These sealing means advantageously comprise a four-lip sealing ring with its lips in a X-configuration, or else a pair of sealing rings each having two lips oriented in respective opposite directions. The sealing means used in the present invention are preferably housed in a sleeve fixed to one of the walls of the housing.

In order to compensate for variations in the pressure inside the housing and avoid consequent deformation thereof due to thermal expansion of the viscous damping fluid, the internal chamber of the housing advantageously includes a bubble of air.

BRIEF DESCRIPTION OF THE DRAWINGS

An embodiment of the invention is described by way of example with reference to the accompanying drawings, in which:

FIG. 3 is a section through said housing on a section plane referenced III—III in FIG. 2;

FIG. 4 is a view of the blade of the damping device in accordance with the present invention;

FIG. 5 is a section through said blade on a section plane referenced V—V in FIG. 4;

FIG. 6 is a side view of a bearing element of a damping device in accordance with the invention; and more particularly the top half of FIG. 6 shows an outside view of the bearing and the bottom half of FIG. 6 is an axial section therethrough;

FIG. 7 is a view of a sealing member of a damping device in accordance with the invention, and more particularly the top of FIG. 7 is a section through the sealing member, while the bottom of FIG. 7 is an outside view thereof;

FIG. 8 shows an embodiment of a damping device where the fins are transverse to the pivot axis of the blade; and FIGS. 9 and 10 show two variants of the damping device with a single sealing ring and two sealing rings arrangement respectively.

MORE DETAILED DESCRIPTION

Figure 1:
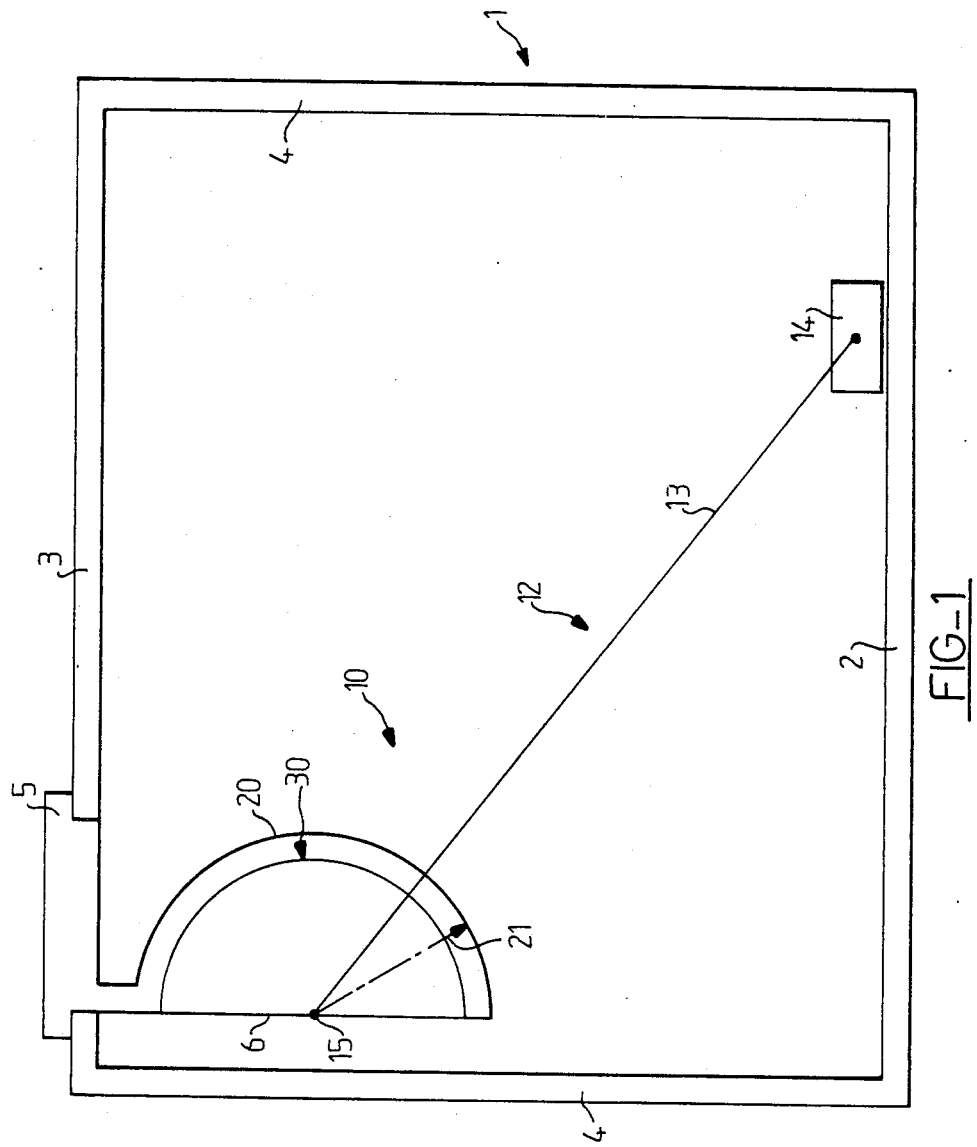
FIG. 1 is an overall view of a liquid level measuring device in accordance with the present invention.

FIG. 1 shows a tank 1 which contains a fuel level measuring device 10.

The tank 1 has a bottom wall 2, a top wall 3, and side walls 4.

The top wall 3 is provided with a stopper 5 from which a bracket 6 is suspended, said bracket supporting the measuring device 10. The measuring device comprises moving equipment 12, a sensitive member of the rheostat type 20, and a damping device 30.

The moving equipment 12 comprises a rod 13 having a float 14 mounted thereon. The rod 13 is pivotally mounted on the bracket 6 via a bearing 15 having a horizontal axis. The bearing 15 also supports a cursor 21 for the rheostat 20. Conventional electric wire connections which are accessible from outside the tank are connected firstly to the cursor 21 and secondly to at least one of the ends of the resistive track of the rheostat 20. These connections are omitted from FIG. 1 for reasons of clarity.

Figure 2:
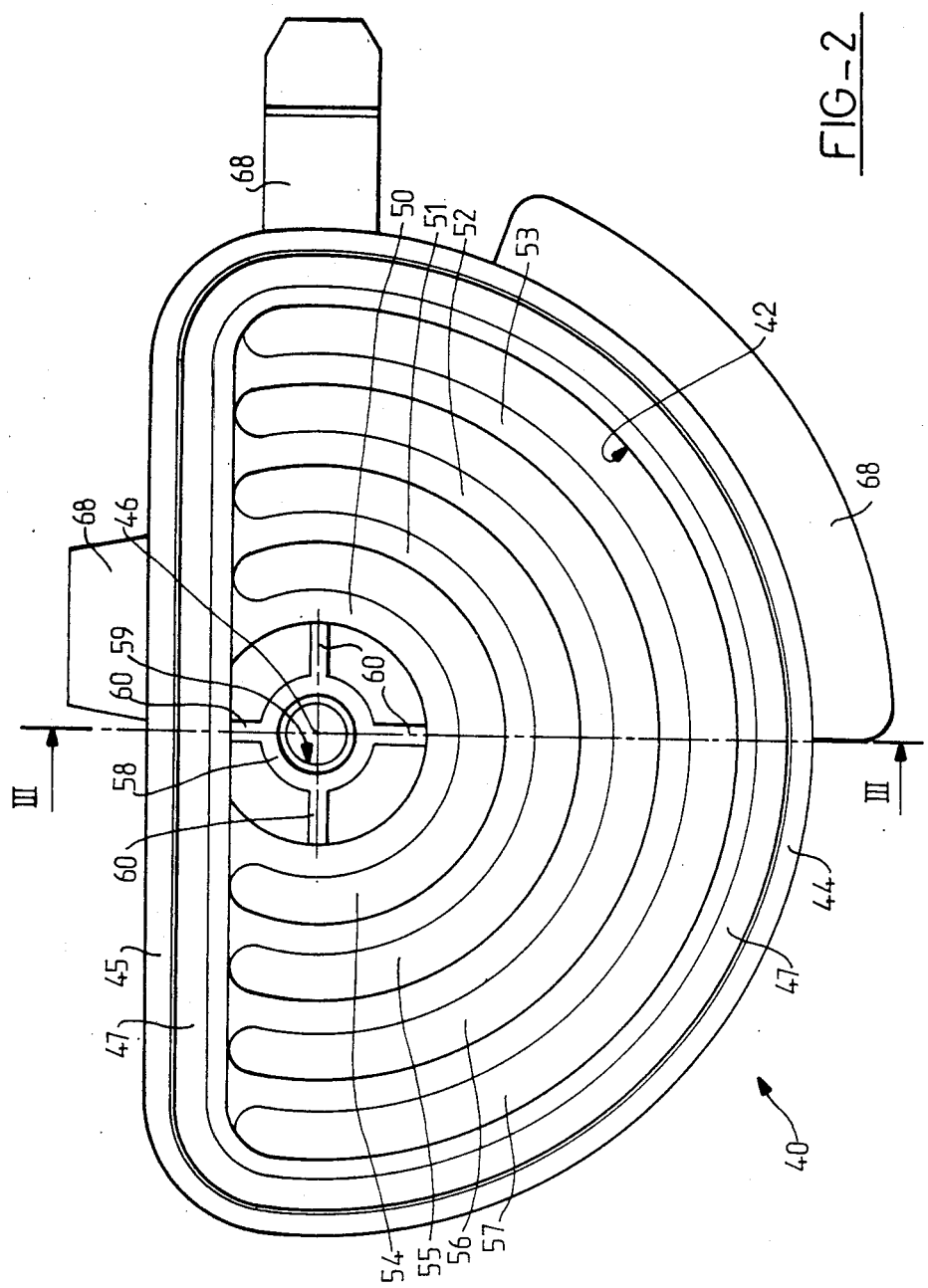
FIG. 2 is a view of the internal chamber and the blade of the damping housing shown in FIG. 1.

In outline, the damping device 30 comprises a housing 40 shown in FIGS. 2 and 3 and a blade 70 shown in FIGS. 4 and 5.

The housing 40 defines a sealed chamber 42 which contains a damping fluid such as silicone.

The chamber 42 is preferably substantially semicylindrical. The chamber 42 is delimited by a base wall 43 and by walls 44 and 45. The base wall 43 is plane and is generally in the form of a half-disk. The side walls 44 and 45 extend perpendicularly from the base wall 43. The side wall 44 is semicylindrical and is centered on an axis 46 which extends perpendicularly to the base wall 43. The side wall 45 is plane, parallel to the axis 46 and interconnects the two ends of the semicylindrical wall 44.

The plane wall 45 is eccentric relative to the axis 46 so that the semicylindrical wall 44 occupies an arc of about 210° about the axis 46.

The chamber 42 of the housing is closed by a cover (not shown). The cover is fixed to the free edges of the walls 44 and 45, and extends generally parallel to the base wall 43.

In order to obtain secure sealing of the housing where the side walls 44 and 45 meet the cover, said side walls 44 and 45 are provided on their free edges 41 extending parallel to the base wall 43 with a groove 47 which follows the contour of said walls.

The groove 47 is intended to receive a sealing ring or rib of complementary shape provided on the cover.

The housing 40 also comprises a series of fins 50, 51, 52, and 53 inside the chamber 42. The fins are substantially semicylindrical and they are concentric, being centered on the above-mentioned axis 46. The height of the fins 50 to 53 is less than the height of the side walls 44 and 45. In combination with the semicylindrical side wall 44, the fins 50 to 53 define a series of arcuate recesses 54 to 57 of generally rectangular right cross-section, which are concentric and centered on the axis 46. The base wall 43 is provided, close to the plane side wall 45, with a cylindrical bush 58 having a central bore 59 centered on the axis 46.

The bush 58 is reinforced by four external radial fins 60. The bore 59 serves as a bearing for a shaft 100 fixed to the blade 80.

The bore 59 passes through the base wall 43.

In addition, the outside of the base wall 43, i.e. the side facing away from the chamber 42, is provided with a sleeve 61 whose internal cylindrical volume 62 is centered on the axis 46 and which extends to the bore 59.

The sleeve 61 is intended to receive a second bearing element 70 rotatably supporting the shaft 100. The bearing element 70 is visible in FIG. 6. Essentially, this element 70 comprises a collar 72 which is generally cylindrical in outline and whose outside diameter fits the inside diameter of the space 62 defined by the sleeve 61.

The bearing element 70 has a stepped internal bore 74 which rotatably supports the shaft 100. The bearing element 70 is provided on its outside surface with an annular flange 76 intended to come into abutment against the free end of the sleeve 61 in order to define the axial position of the bearing element 70 relative to the sleeve.

Finally, the housing 40 is provided on its outside surface with a plurality of fastening structures given a general reference 68. The fastening structures 68 are suitable for fixing the housing 40 to the bracket 6 of the measuring device. These fastening structures 68 enable the damping housing to be made in the form of a self-contained subassembly which can be fitted to various different types of measuring device.

These fastening structures 68 are capable of taking numerous different forms and are therefore not described in detail below.

Reference is now made to the structure of the blade 80 shown in FIGS. 4 and 5.

The blade 80 comprises a sheet 82 which is generally in the form of a sector of a disk.

More precisely, the sheet 82 is delimited by a surface 83 in the form of a sector of a cylinder centered on an axis 81 and of small radius, a surface 84 in the form of a sector of a cylinder, likewise centered on the axis 81 but having a radius which is greater than the radius of the surface 83, and two plane surfaces 85 and 86 extending parallel to the axis 81 and tangentially to the surface 83 and terminating the surface 84.

The radius of the surface 83 corresponds substantially to the degree to which the inside surface of the plane side wall 45 of the housing is eccentric relative to the axis 46. Further, the surface 84 corresponds substantially to the inside radius of the semicylindrical side wall 44 about the axis 46.

The angle between the surfaces 85 and 86 is about 75°.

In addition, the blade 80 has a series of fins 90, 92, 94, and 96 for interleaving between the fins 50, 51, 52, and 53 provided on the housing 40.

The fins 90, 92, 94, and 96 are in the form of concentric cylindrical sectors centered on the axis 81. The fins 90, 92, 94, and 96 extend perpendicularly to the plane sheet 82.

These fins 90, 92, 94, and 96 define a series of arcuate recesses 91, 93, 95, and 97.

The radial distribution of the fins 90, 92, 94, and 96 relative to the axis 81 corresponds to the radial distribution about the axis 46 of the semicircular recesses 54, 55, 56, and 57 provided in the housing 40.

Conversely, the radial distribution of the fins 50, 51, 52, and 53 about the axis 46 corresponds to the radial intervals about the axis 81 between the recesses 91, 93, 95, 97.

The thicknesses of the fins 50, 51, 52, and 54, and the thicknesses of the fins 90, 92, 94, 96, and also the widths of the recesses 91, 93, 95, and 97, and of the recesses 54, 55, 56, and 57 for receiving said fins as measured in a radial direction relative to the axes 46 and 81 is determined in such a manner that the gap left between two adjacent fins, one belonging to the housing 40 and the other to the plate 80, is about 0.6 mm to 0.4 mm, and is preferably substantially equal to 0.5 mm.

This gap seems suitable for obtaining optimum viscous friction between the various fins during relative displacement between the plate 80 and the housing 40.

Further, as can be seen from the figures, the fins of at least one of the two series of fins respectively provided on the housing 40 and on the blade 80 preferably possess main surfaces (generally parallel to the pivot axes 81 and 46) which converge slightly towards their free edges with a convergence angle of about 2° to about 4°.

In the embodiment shown in the accompanying drawings, the main surfaces of the fins 50, 51, 52, and 53 provided on the housing have such an angle of convergence equal to about 2° to about 4°.

It may also be observed from FIGS. 4 and 5 that the plane sheet 82 includes a cylindrical reinforcement 102 on the same side as the fins 90, 92, 94, and 96 and centered on the axis 81, said reinforcement enabling the blade 80 to be fixed on a shaft 100 which is coaxial with the axis 81. Preferably, the blade 80 is made of plastic material and is molded in place on the shaft 100. The shaft extends from the same side of the plane sheet 82 as do the fins 90, 92, 94, and 96.

Means are provided for sealing the damping device around the periphery of the shaft 100. In accordance with the present invention, these sealing means are constituted by a sealing ring having four lips disposed in an X-configuration.

More precisely, and preferably, the sealing means comprise two sealing rings each having two lips and disposed back-to-back, said lips being exposed in respective opposite directions and forming, in combination, a set of sealing rings including four lips in an X-configuration.

FIG. 7 shows one such sealing ring 130 having two lips 132 and 140.

In FIG. 7, reference 150 designates the axis of the sealing ring, and reference 131 designates its annular web. The two lips 132 and 140 extend generally parallel to the axis 150 while diverging slightly in the axial direction. FIG. 7 shows an inner lip 140 which converges towards the axis 150 as it moves away from the web 131 and an outer lip 132 which diverges away from the axis 150 likewise going away from the web 131.

The ends 134 and 144 of the lip 132 and 140 are chamfered to provide surfaces inclined in opposite directions relative to the axis 150. Thus, the outer lip 132 has a pointed edge 135 at its leading end and an edge 136 which is further out and closer to the web 131 than is the leading edge 135.

In a generally similar manner, the inner lip 140 has a leading edge 145 and an inner edge 146 which lies radially inside the edge 145 and closer to the web 131.

Further, and preferably, the inner lip 140 extends a shorter distance in the axial direction than does the outer lip 132.

It can be seen that FIGS. 6 and 7 are to a larger scale than FIG. 3, and that the bearing element 70 and the lipped sealing ring 130 and intended to be inserted inside the cylindrical inside space 62 of the sleeve 61.

A damping device in accordance with the present invention is assembled as follows.

Initially, the shaft 100 of the blade 80 is inserted into the bore 59 which constitutes a bearing surface and the fins 90, 92, 94, and 96 of the blade are received in the arcuate recesses 54, 55, 56, and 57 of the housing, with the fins 50, 51, 52, and 53 of the housing being simultaneously received in the recesses 91, 93, 95, and 97 of the blade.

It may be observed, that in order to ensure that the shaft 100 cannot rotate relative to the blade 80, it is preferably for the end 102 of the shaft 100 on which the sheet 82 is molded to be provided with axially-extending fluting.

Two lipped sealing rings 130 of the type shown in FIG. 6 are engaged on the shaft 100 inside the sleeve 61.

The first sealing ring 130 engaged inside the sleeve 61 has its lips 132 and 140 directed towards the base wall 43. The second sealing ring 130 inserted into the sledve 61 has its lips 132 and 140 directed away from the base wall 43.

The sealing rings 130 are placed back-to-back and come into contact via the rear plane walls 151 of their webs 131 which extend perpendicularly to the axis 150.

The outermost edges 136 of the oute rlips 132 rest against the surface of the internal cylindrical volume 62 of the sleeve 61. The inner edges 146 of the inner lips 140 rest against the outer periphery of the shaft 100.

The first engagd sealing ring 130 in the sleeve 61 seals the inside of the chamber 42 from the outside, with excess pressure in the chamber 42 tending to increase the force with which the lips 132 and 140 of this sealing ring are respectively pressed against the wall of the cylindrical space 62 in the sleeve and against the central shaft 100.

Conversely, the second sealing ring 130 to be engaged in the sleeve 61 provides sealing protecting the inside chamber 42 of the damping device from the outside.

A reduction of pressure inside the chamber 42 tends to increase the contact force between the lips 132 and 140 of said second sealing ring against the surface of the inside cylindrical space 62 of the sleeve and the outer peripheral surface of the shaft 100 respectively.

The sealing rings 130 are enclosed inside the sleeve 51 by means of the bearing element 70 which is fixed at the end of the sleeve 71.

Simultaneously, rotation of the shaft 100 is accurately and reliably guided by means of two bearings 59 and 74.

A viscous fluid such as silicone is inserted in the chamber 42 and the chamber is then closed in sealed manner by means of a cover which is fixed to the side walls 44 and 45.

The damping device is then ready for use and may be fixed to the bracket 6 by means of the structure 68, with the cursor 21 of the rheostat 20 and the lever 13 of the moving equipment 12 being fixed to rotate together with the shaft 100, for example by being fixed to the end 104 thereof which has fluting on its outside surface.

It may be observed that a damping device in accordance with the invention comprises a small number of parts. It is therefore quick and easy to assemble. Further, a damping device in accordance with the present invention is particularly robust and reliable.

When the blade 80 pivots inside the chamber 42 of the housing 40 it is braked by a combination firstly of the controlled flow of fluid from one side of the blade to the other via the interstices defined between the blade and the housing, and secondly by the viscous friction between the interleaved fins 90, 92, 94, 96 and 50, 51, 52, 53.

The person skilled in the art will readily understand that such a damping device can be used to obtain a considerably greater damping coefficient than that which can be obtained by using prior art damping devices such as those described, for example, in the above-mentioned document DE-B No. 1 155 262, in which the blade is braked solely by the controlled flow of fluid from one side of the blade to the other via interstices between the blade and the housing.

Further, by interleaving two series of fins provided respectively on the housing and on the moving blade, it is possible to obtain highly accurate auto-centering of these two components.

It may also be observed that the influence of temperature variations on the controlled flow of fluid from one side of the blade to the other is opposite to the influence of temperature variation on the viscous friction between the fins.

For example, if the temperature rises, the controlled flow of fluid from one side of the blade to other is facilitated insofar as the viscous damping fluid becomes more fluid, and this tends to reduce the braking effect on the blade. However the resulting expansion of the fins 90, 92, 94, 96, and 50, 51, 52, 53 serves to increase the viscous friction by reducing the corresponding gaps between the fins, thereby providing a compensating effect blade braking.

Conversely, when the ambient temperature drops, the braking effect due to the controlled flow of fluid from one side of the blade to the other is increased while at the same time the viscous friction between the fins is reduced due to a corresponding increase in the gaps therebetween.

The semicylindrical shape of the housing of a damping device in accordance with the present invention makes it possible, as can be seen from FIG. 1, to obtain a common shaft for the cursor 21 of the rheostat 20 and for the lever 13 of the moving equipment while still retaining a relatively small stopper 5 for providing access to the inside volume of the fuel tank.

In a specific embodiment described by way of non-limiting example:

four fins 90, 92, 94, and 96 and are provided on the blade 80 and four fins 50, 51, 52, and 53 are provided in the housing 40;

the radial thickness of the fins 50, 51, 52, and 53 is about 1.8 mm;

the radial thickness of the fins 90, 92, 94, and 96 is about 1.2 mm;

the radial width of the arcuate recesses 54, 55, 56, and 57 provided in the housing is about 2.2 mm;

the radial width of the arcuate recesses 91, 93, 95, and 97 provided on the blade 80 is about 2.8 mm; and the height of the fins measured perpendicularly to the base wall 43 and to the sheet 82 is about 8 mm.

Naturally, the present is not limited to the above-described embodiment, but extends to any variant thereof falling within the scope of the claims.

Thus, for example, the damping device may comprise a different number of fins. The damping device may comprise fins which are generally plane and which extend transversely to the pivot axis of the blade. (see FIG. 8).

Finally, in the above-described disposition, the housing 40 is fixed and the blade 80 is connected to the moving equipment and therefore pivots in the chamber 42 of the housing.

It is also possible to provide a rotary housing 40 which is connected to the moving equipment 12 while the blade 80 is fixed to the support bracket 6 for the measuring device.

It may be observed that in accordance with an important characteristic of the invention, in order to enable the viscous damping fluid to expand inside the chamber 42 with changing temperature, without running the risk of leaks of viscous damping fluid out from the housing and without deforming the housing, it is necessary to ensure that a bubble of air remains within the chamber 42 when it is being filled with viscous fluid.

I claim:

1. A damping device comprising:
   a housing defining a sealed chamber in the form of a semicylindrical sector having a series of concentric semicylindrical main fins, which are centered about a main axis,
   a shaft passing through a wall of the housing, said shaft being centered on said main axis and being free to pivot about said main axis,
   a blade pivotally mounted in the chamber, said blade including:
   a plane sheet in the form of a sector of a disk having an angle of less than 180° between its edges, said plane sheet extending perpendicularly to said main axis and being linked with said shaft, and
   a series of concentric semicylindrical secondary fins linked with said plane sheet, said secondary fins being centered about said main axis and inserted between the main fins,
   a viscous damping fluid in said sealed chamber, and
   sealing means having four ring lips in an X-configuration provided around the periphery of the shaft to prevent the viscous damping fluid from leaving the housing and to prevent fluid outside the housing from penetrating therein,
   such that relative displacement of the blade and the housing is braked firstly by controlled flow of the fluid from one side of the blade to the other, via interstices between the blade and the housing, and secondly by viscous friction between the interleaved main and secondary fins, wherein the sealing means are received in a sleeve which extends from said wall and wherein said wall of the housing includes a bore defining a first bearing for the shaft and wherein a bearing element defining a second bearing for the shaft is inserted in the sleeve outside of the sealing means.

2. A damping device according to claim 1, wherein the gaps defined between adjacent pairs of fins have a width lying the range 0.6 mm to 0.4 mm and are preferably about 0.5mm.

3. A damping device according to claim 1, wherein the fins of at least one of the two series of fins provided respectively inside the housing and on the blade are provided with main surfaces which converge slightly towards their free edges with a convergence angle of about 2° to about 4°.

4. A damping device according to claim 1, wherein the sealing means comprise two sealing rings each having two lips with the lips of the two sealing rings pointing in opposite directions.

5. A damping device according to claim 1, wherein the chamber of the housing receives a bubble of air to allow the viscous damping fluid to change volume with changing temperature without leaking from the housing.

6. A damping device according to claim 1 wherein the viscous damping fluid is silicone.

* * * * *

UNITED STATES PATENT AND TRADEMARK OFFICE
CERTIFICATE OF CORRECTION

PATENT NO. : 4,821,571
DATED : April 18, 1989
INVENTOR(S) : Philippe REYMOND

It is certified that error appears in the above-identified patent and that said Letters Patent is hereby corrected as shown below:

Cover page at item [22]: change the filing date from "Feb. 24, 1986" to --February 24, 1987--.

Signed and Sealed this

Eighth Day of May, 1990

Attest:

HARRY F. MANBECK, JR.

*Attesting Officer*  *Commissioner of Patents and Trademarks*